United States Patent
Yokomizo et al.

(10) Patent No.: US 8,603,230 B2
(45) Date of Patent: Dec. 10, 2013

(54) INDOOR UNIT OF AIR CONDITIONER

(75) Inventors: Tsuyoshi Yokomizo, Osaka (JP);
Yoshiteru Nouchi, Osaka (JP); Yukihiro Takagaki, Osaka (JP); Akihiko Sakashita, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 329 days.

(21) Appl. No.: 12/864,286

(22) PCT Filed: Jan. 26, 2009

(86) PCT No.: PCT/JP2009/000287
§ 371 (c)(1),
(2), (4) Date: Jul. 23, 2010

(87) PCT Pub. No.: WO2009/093478
PCT Pub. Date: Jul. 30, 2009

(65) Prior Publication Data
US 2010/0294134 A1 Nov. 25, 2010

(30) Foreign Application Priority Data

Jan. 25, 2008 (JP) ................... 2008-015520

(51) Int. Cl.
*B01D 46/46* (2006.01)
(52) U.S. Cl.
USPC ............. 96/405; 55/283; 55/366; 55/395; 55/429; 55/430; 55/432; 55/466; 96/408; 96/417; 96/425

(58) Field of Classification Search
USPC ............. 55/283, 295–297, 428, 429; 96/397, 96/398, 399, 405, 417–423, 424, 425
See application file for complete search history.

(56) References Cited

U.S. PATENT DOCUMENTS

| | | | | | |
|---|---|---|---|---|---|
| 2,700,362 | A | * | 1/1955 | Calling | 116/271 |
| 3,201,772 | A | * | 8/1965 | Ladusaw | 340/607 |
| 4,240,072 | A | * | 12/1980 | Fowler | 340/664 |
| 5,315,838 | A | * | 5/1994 | Thompson | 62/129 |
| 5,429,649 | A | * | 7/1995 | Robin | 96/405 |
| 5,668,535 | A | * | 9/1997 | Hendrix et al. | 340/607 |
| 6,129,781 | A | * | 10/2000 | Okamoto et al. | 96/25 |

(Continued)

FOREIGN PATENT DOCUMENTS

| | | |
|---|---|---|
| CN | 1766455 A | 5/2006 |
| CN | 101057110 A | 10/2007 |

(Continued)

OTHER PUBLICATIONS

Partial English translation of JP-2006-71130-A, dated Mar. 16, 2006.

*Primary Examiner* — Duane Smith
*Assistant Examiner* — Sonji Turner
(74) *Attorney, Agent, or Firm* — Birch, Stewart, Kolasch & Birch, LLP.

(57) ABSTRACT

An indoor unit (1) is provided with an output control portion (35, 71) for controlling a cleaning signal output portion (33, 48) to output a cleaning signal when it is determined that the amount of dust in a dust storing portion (60, 90) has reached a predetermined first level, and when it is determined that the amount of dust in the dust storing portion (60, 90) has reached a second level that is higher than the first level.

9 Claims, 6 Drawing Sheets

(56) References Cited

U.S. PATENT DOCUMENTS

| | | | |
|---|---|---|---|
| 6,729,154 B2 * | 5/2004 | Takashima et al. | 62/317 |
| 6,734,801 B2 * | 5/2004 | Scofield | 340/607 |
| 7,253,743 B2 * | 8/2007 | Liang et al. | 340/606 |
| 7,445,665 B2 * | 11/2008 | Hsieh et al. | 96/417 |
| 7,555,914 B1 * | 7/2009 | Davis | 62/272 |
| 7,713,330 B2 * | 5/2010 | Bohlen et al. | 95/2 |
| 7,914,596 B2 * | 3/2011 | Miyazaki et al. | 55/332 |
| 2004/0000160 A1 * | 1/2004 | Takashima et al. | 62/317 |
| 2006/0070358 A1 * | 4/2006 | Oda et al. | 55/295 |
| 2006/0213216 A1 * | 9/2006 | Sakashita et al. | 62/419 |
| 2007/0157819 A1 * | 7/2007 | Kang | 96/417 |
| 2009/0056289 A1 * | 3/2009 | Miyazaki et al. | 55/332 |

FOREIGN PATENT DOCUMENTS

| | | | | |
|---|---|---|---|---|
| EP | 1 741 992 A2 | | 1/2007 | |
| EP | 1 762 790 A2 * | | 3/2007 | F24F 1/00 |
| JP | 5-272789 A | | 10/1993 | |
| JP | 7-224790 A | | 8/1995 | |
| JP | 7-260231 A | | 10/1995 | |
| JP | 10 160 227 | * | 6/1998 | |
| JP | 10 160227 | * | 6/1998 | |
| JP | 2004-239449 A | | 8/2004 | |
| JP | 2005 009729 | * | 1/2005 | |
| JP | 2006-71130 A | | 3/2006 | |
| JP | 2006 100309 A | * | 4/2006 | |
| JP | 2006 275310 A | * | 10/2006 | |
| JP | 2007 271174 | * | 10/2007 | |

\* cited by examiner

FIG. 8
(A) 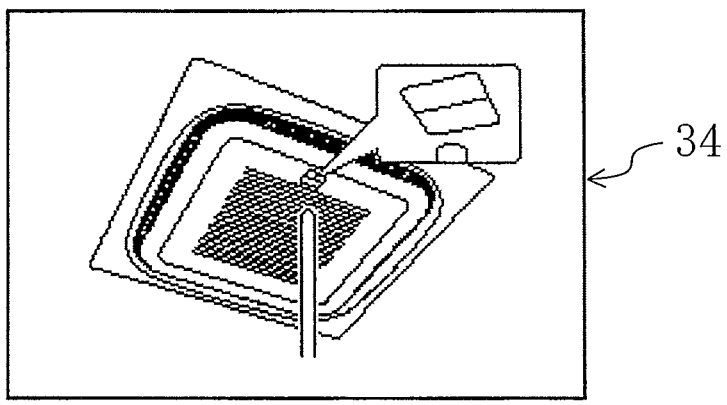
(B) 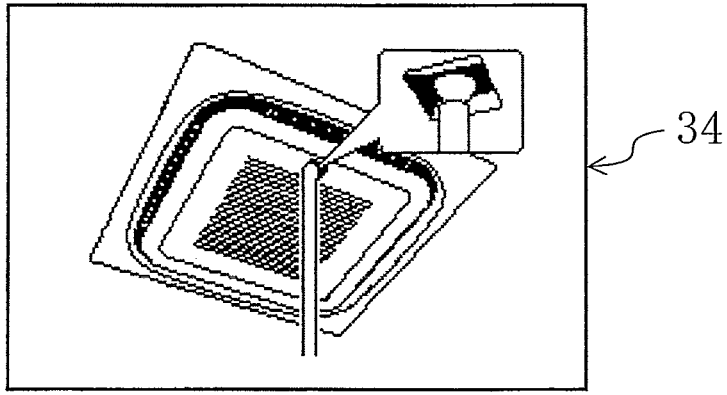

INDOOR UNIT OF AIR CONDITIONER

TECHNICAL FIELD

The present invention relates to indoor units of air conditioners for air conditioning a room.

BACKGROUND ART

Conventionally, indoor units having a function to remove dust adhering to an air filter are known as indoor units of air conditioners for air conditioning a room. For example, Patent Document 1 discloses an indoor unit for performing an automatic cleaning operation of automatically cleaning an air filter. This indoor unit determines whether to perform the automatic cleaning operation based on the accumulated operation time of the indoor unit. When the accumulated operation time of the indoor unit reaches a predetermined value, maintenance information is displayed on a main body display portion in order to notify the user of the need to remove dust from a dust box for storing dust removed from the air filter.

CITATION LIST

Patent Document

PATENT DOCUMENT 1: Japanese Published Patent Application No. 2004-239449

SUMMARY OF THE INVENTION

Technical Problem

Incidentally, conventional indoor units of air conditioners output a cleaning signal, which notifies the user of the need to clean a dust storing portion, namely the need to remove dust stored in the dust storing portion, only when the accumulated operation time of the indoor unit after the previous removal of dust from the dust storing portion reaches a predetermined value. That is, the conventional indoor units output only the cleaning signal corresponding to one level of the amount of dust. Thus, the dust storing portion need be cleaned every time the cleaning signal is output, and the user cannot clean the dust storing portion in a flexible manner.

The present invention was developed in view of the above problem, and it is an object of the present invention to enable the user to recognize stepwise the urgency of the need to clean a dust storing portion in an indoor unit of an air conditioner having the dust storing portion for storing dust removed from an air filter.

Solution to the Problem

According to a first invention, an indoor unit (1) of an air conditioner includes: a casing (20) having an inlet (13) and an outlet (14); an indoor fan (21) for blowing air drawn through the inlet (13), into the outlet (14); and an air filter (30) for capturing dust contained in the air drawn through the inlet (13), wherein the air conditioner performs an air conditioning operation of blowing the air drawn through the inlet (13), into a room through the outlet (14). The indoor unit (1) further includes: a dust removing portion (40, 50) for removing from the air filter (30) the dust captured by the air filter (30); a dust storing portion (60, 90) for storing the dust removed from the air filter (30); a cleaning signal output portion (33, 48) for outputting a cleaning signal that indicates a need to remove the dust from the dust storing portion (60, 90); and an output control portion (35, 71) for controlling the cleaning signal output portion (33, 48) to output the cleaning signal when it is determined that an amount of dust in the dust storing portion (60, 90) has reached a predetermined first level, and when it is determined that the amount of dust in the dust storing portion (60, 90) has reached a second level that is higher than the first level.

According to a second invention, in the first invention, the output control portion (35, 71) inhibits a cleaning operation of removing the dust from the air filter (30) by the dust removing portion (40, 50), when it is determined that the amount of dust in the dust storing portion (60, 90) has reached the second level.

According to a third invention, in the second invention, the indoor unit (1) further includes a clogging detection section (37) for detecting clogging of the air filter (30), wherein the output control portion (35, 71) inhibits the air conditioning operation when it is determined based on an output of the clogging detection section (37) that the clogging of the air filter (30) has reached a predetermined level, after it is determined that the amount of dust in the dust storing portion (60, 90) has reached the second level.

According to a fourth invention, in the first or second invention, the output control portion (35, 71) inhibits the air conditioning operation when it is determined that the amount of dust in the dust storing portion (60, 90) has reached the second level.

According to a fifth invention, in the second or third invention, the indoor unit (1) further includes an inhibition termination input portion (55) for inputting a command to terminate a state where the output control portion (35, 71) inhibits the cleaning operation, the output control portion (35, 71) also controls the cleaning signal output portion (33, 48) to output the cleaning signal, when it is determined that the amount of dust in the dust storing portion (60, 90) has reached a third level that is higher than the second level, in addition to the first level and the second level, and the state where the output control portion (35, 71) inhibits the cleaning operation can be terminated by input to the inhibition termination input portion (55), only before it is determined that the amount of dust in the dust storing portion (60, 90) has reached the third level.

According to a sixth invention, in any one of the first to fourth inventions, the indoor unit (1) further includes a detection sensor (71) for detecting the amount of dust in the dust storing portion (60, 90), and the output control portion (35, 71) determines if the amount of dust in the dust storing portion (60, 90) has reached the first level or not, based on an output of the detection sensor (71).

According to a seventh invention, in the sixth invention, the output control portion (35, 71) determines if the amount of dust in the dust storing portion (60, 90) has reached the second level or not, based on an accumulated operation time of the indoor fan (21) or the air conditioner after it is determined that the amount of dust in the dust storing portion (60, 90) has reached the first level.

According to an eighth invention, in the seventh invention, the output control portion (35, 71) also controls the cleaning signal output portion (33, 48) to output the cleaning signal, when it is determined that the amount of dust in the dust storing portion (60, 90) has reached a third level that is higher than the second level, in addition to the first level and the second level, and the output control portion (35, 71) determines if the amount of dust in the dust storing portion (60, 90) has reached the third level or not, based on the accumulated operation time of the indoor fan (21) or the air conditioner after it is determined that the amount of dust in the dust storing portion (60, 90) has reached the second level.

According to a ninth invention, in any one of the first to eighth inventions, the cleaning signal output portion (33, 48) outputs different kinds of the cleaning signal according to the level of the amount of dust at which the cleaning signal is output.

According to a tenth invention, in any one of the first to ninth inventions, when outputting the cleaning signal of the level corresponding the largest amount of dust out of the levels at which the cleaning signal is output, the cleaning signal output portion (33, 48) outputs the cleaning signal and an abnormal code that indicates an abnormal condition of the dust storing portion (60, 90).

According to an eleventh invention, in any one of the first to tenth inventions, the indoor unit (1) further includes a measuring timer (37) for measuring an accumulated operation time of the indoor fan (21) or the air conditioner after the dust is removed from the dust storing portion (60, 90), and the output control portion (35, 71) also controls the cleaning signal output portion (33, 48) to output the cleaning signal, when the time measured by the measuring timer (37) or a time calculated by using the measured time reaches a predetermined reference value.

[Functions]

In the first invention, dust is stored in the dust storing portion (60, 90) every time the dust captured by the air filter (30) in the air conditioning operation is removed by the dust removing portion (40, 50). When it is determined that the amount of dust in the dust storing portion (60, 90) has reached the first level, the output control portion (35, 71) controls the cleaning signal output portion (33, 48) to output the cleaning signal. If the dust storing portion (40, 50) is not cleaned and dust is further stored in the dust storing portion (60, 90), and it is determined that the amount of dust in the dust storing portion (60, 90) has reached the second level, the output control portion (35, 71) controls the cleaning signal output portion (33, 48) to output the cleaning signal. In the first invention, the cleaning signal that indicates the need to remove the dust from the dust storing portion (60, 90) is output at each of the two levels corresponding to the different amounts of dust from each other.

In the second invention, when it is determined that the amount of dust in the dust storing portion (60, 90) has reached the second level, the output control portion (35, 71) controls the cleaning signal output portion (33, 48) to output the cleaning signal, and inhibits the cleaning operation. The cleaning operation is inhibited in response to the output of the cleaning signal of the second level. The cleaning signal of the first level is output before the cleaning operation is inhibited at the second level.

In the third invention, when the amount of dust in the dust storing portion (60, 90) reaches the second level, only the cleaning operation is inhibited out of the cleaning operation and the air conditioning operation. The air conditioning operation is also inhibited if the amount of dust on the air filter (30) reaches the predetermined level after the amount of dust in the dust storing portion (60, 90) has reached the second level. In the third invention, the air conditioning operation can be performed until the amount of dust on the air filter (30) reaches the predetermined level, even after the amount of dust in the dust storing portion (60, 90) reaches the second level and the cleaning operation is inhibited.

In the fourth invention, when it is determined that the amount of dust in the dust storing portion (60, 90) has reached the second level, the output control portion (35, 71) controls the cleaning signal output portion (33, 48) to output the cleaning signal, and inhibits the air conditioning operation. The air conditioning operation is inhibited in response to the output of the cleaning signal of the second level. The cleaning signal of the first level is output before the air conditioning operation is inhibited at the second level.

In the fifth invention, the cleaning operation is inhibited in response to the output of the cleaning signal of the second level, but the state where the cleaning operation is inhibited is terminated by input to the inhibition termination input portion (55), before the cleaning signal of the third level is output. Once the cleaning signal of the third level is output, the state where the cleaning operation is inhibited is not terminated even if there is input to the inhibition termination input portion (55). Thus, no dust is stored in the dust storing portion (60, 90) by the cleaning operation after the cleaning signal of the third level is output.

In the sixth invention, the output of the detection sensor (71) is used to determine if the amount of dust in the dust storing portion (60, 90) has reached the first level or not. Thus, whether the amount of dust in the dust storing portion (60, 90) has reached the first level or not can be more accurately detected as compared to the case where, e.g., the amount of dust is estimated based on the accumulated operation time of the indoor unit.

In the seventh invention, the accumulated operation time of the indoor fan (21) or the air conditioner is used to determine if the amount of dust in the dust storing portion (60, 90) has reached the second level or not. This eliminates the need to provide a detection sensor (71) for detecting if the amount of dust in the dust storing portion (60, 90) has reached the second level or not, in addition to the detection sensor (71) for determining if the amount of dust has reached the first level or not.

In the eighth invention, the accumulated operation time of the indoor fan (21) or the air conditioner is used to determine if the amount of dust in the dust storing portion (60, 90) has reached the third level or not. This eliminates the need to provide a detection sensor (71) for detecting if the amount of dust in the dust storing portion (60; 90) has reached the third level or not, in addition to the detection sensor (71) for determining if the amount of dust has reached the first level or not.

In the ninth invention, different kinds of the cleaning signal are output according to the level of the amount of dust at which the cleaning signal is output. The cleaning signal that is output at the first level is different from the cleaning signal that is output at the second level. Thus, the dust level of the cleaning signal is identified.

In the tenth invention, the abnormal code is output when outputting the cleaning signal of the level corresponding the largest amount of dust out of the levels at which the cleaning signal is output. For example, in the case of the indoor unit that outputs the cleaning signal at three levels, namely the first to three levels, the abnormal code is output when outputting the cleaning signal of the third level. In the tenth invention, the abnormal code is output when outputting the cleaning signal that indicates the greatest urgency of the need to clean the dust storing portion (60, 90).

In the eleventh invention, the cleaning signal is output not only when it is determined that the amount of dust in the dust storing portion (60, 90) has reached the predetermined level, but also when the time measured by the measuring timer (37) or the time calculated by using the measured time has reached the predetermined reference value. The accumulated operation time of the indoor fan (21) or the air conditioner reflects the amount of air that has passed through the air filter (30). The larger the amount of air that has passed through the air filter (30) is, the larger the amount of dust that is stored in the dust storing portion (60, 90) is. In the eleventh invention, the accumulated operation time of the indoor fan (21) or the air conditioner, which reflects the amount of dust in the dust storing portion (60, 90), is used to determine whether to output the cleaning signal.

Advantages of the Invention

In the present invention, the output control portion (35, 71) is provided which controls the cleaning signal output portion (33, 48) to output the cleaning signal when it is determined that the amount of dust in the dust storing portion (60, 90) has reached the first level, and when it is determined that the amount of dust in the dust storing portion (60, 90) has reached the second level, whereby the cleaning signal is output at the two levels corresponding to different amounts of dust from each other. Thus, different kinds of the cleaning signal are sequentially output as the amount of dust in the dust storing portion (60, 90) increases. This enables the user to recognize stepwise the level of dust stored in the dust storing portion (60, 90), and thus enables the user to recognize stepwise the urgency of the need to clean the dust storing portion (60, 90), whereby the user can flexibly clean the dust storing portion (60, 90).

In the second invention, the cleaning signal of the first level is output before the cleaning operation is inhibited at the second level. Incidentally, even in conventional indoor units that output only a cleaning signal corresponding to one level of the amount of dust, the cleaning operation is inhibited in response to the output of the cleaning signal. In this case, no cleaning signal is output until the cleaning operation is inhibited. In the second invention, however, the cleaning signal of the first level is output before the cleaning operation is inhibited at the second level. Thus, the user can recognize from the cleaning signal of the first level that the cleaning operation will soon be inhibited.

In the third invention, the air conditioning operation can be performed until the amount of dust on the air filter (30) reaches the predetermined level, even after the amount of dust in the dust storing portion (60, 90) reaches the second level and the cleaning operation is inhibited. Thus, the state where the air conditioning operation can be performed is maintained as long as possible, thereby reducing or eliminating the possibility that the room becomes less comfortable immediately after the amount of dust in the dust storing portion (60, 90) reaches the second level at which the cleaning operation is inhibited.

In the fourth invention, the cleaning signal of the first level is output before the air conditioning operation is inhibited at the second level. Incidentally, even in the conventional indoor units that output only a cleaning signal corresponding to one level of the amount of dust, the air conditioning operation is inhibited in response to the output of the cleaning signal. In this case, no cleaning signal is output until the air conditioning operation is inhibited. In the fourth invention, however, the cleaning signal of the first level is output before the air conditioning operation is inhibited at the second level. Thus, the user can recognize from the cleaning signal of the first level that the air conditioning operation will soon be inhibited.

In the fifth invention, once the cleaning signal of the third level is output, the state where the cleaning operation is inhibited cannot be terminated even if there is input to the inhibition termination input portion (55), so that no dust is stored in the dust storing portion (60, 90) by the cleaning operation. This can reduce or eliminate problems caused by an excessive amount of dust in the dust storing portion (60, 90).

In the sixth invention, since the output of the detection sensor (71) is used to determine if the amount of dust in the dust storing portion (60, 90) has reached the first level or not, whether the amount of dust in the dust storing portion (60, 90) has reached the first level or not can be relatively accurately detected. Thus, the cleaning signal of the first level can be output at an appropriate time in terms of the amount of dust in the dust storing portion (60, 90).

In the seventh invention, the accumulated operation time of the indoor fan (21) or the air conditioner is used to determine if the amount of dust in the dust storing portion (60, 90) has reached the second level or not. This eliminates the need to provide a detection sensor (71) in addition to the detection sensor (71) for determining if the amount of dust has reached the first level or not. This can simplify the configuration of the indoor unit.

In the eighth invention, the accumulated operation time of the indoor fan (21) or the air conditioner is used to determine if the amount of dust in the dust storing portion (60, 90) has reached the third level or not. This eliminates the need to provide a detection sensor (71) in addition to the detection sensor (71) for determining if the amount of dust has reached the first level or not. This can simplify the configuration of the indoor unit.

In the ninth invention, different kinds of the cleaning signal are output according to the level of the amount of dust at which the cleaning signal is output, so that the dust level of the cleaning signal can be identified. This enables the user to easily recognize the dust level of the cleaning signal.

In the tenth invention, the abnormal code is output together with the cleaning signal that indicates the greatest urgency of the need to clean the dust storing portion (60, 90). This enables the user to reliably recognize the urgent need to clean the dust storing portion (60, 90).

BRIEF DESCRIPTION OF THE DRAWINGS

FIGS. 8A-8B are diagrams of screens showing examples of images for display on a liquid crystal display portion according to other embodiments.

DESCRIPTION OF REFERENCE CHARACTERS

31 Control Substrate
33 Lighting Portion (Cleaning Signal Output Portion)
34 Liquid Crystal Display Portion
35 Control Portion (Output Control Portion)
37 Measuring Timer
38 Output Determining Portion
39 Output Command Portion
48 Remote Control (Cleaning Signal Output Portion)
54 Lighting Operation Button 55 Reset Button (Inhibition Termination Input Portion)
56 Remote Control Lighting Portion
71 Detection Sensor (Output Control Portion)

DESCRIPTION OF EMBODIMENTS

An embodiment of the present invention will be described in detail below with reference to the accompanying drawings.

The present embodiment is an indoor unit (1) of an air conditioner according to the present invention. The indoor unit (1) is a ceiling-mounted indoor unit that is mounted on a ceiling of a room. The indoor unit (1) has a so-called cleaning function to automatically clean an air filter (30). Note that the air conditioner includes a refrigerant circuit for performing a vapor compression refrigeration cycle, and is configured so as to be able to perform a cooling operation and a heating operation as an air conditioning operation. Of components connected to the refrigerant circuit, an indoor heat exchanger (22) is provided in the indoor unit (1).

Figure 1:
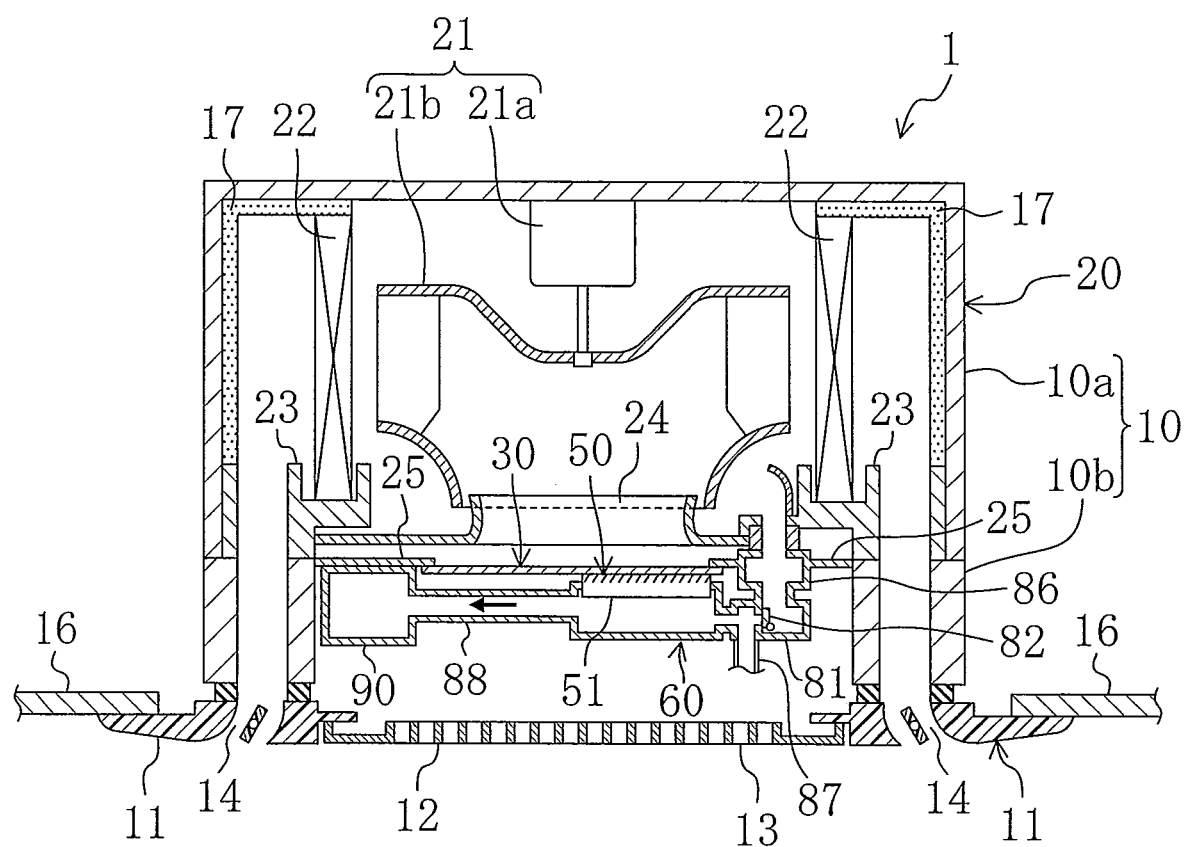
FIG. 1 is a longitudinal cross section of an indoor unit of an embodiment.
Figure 2:
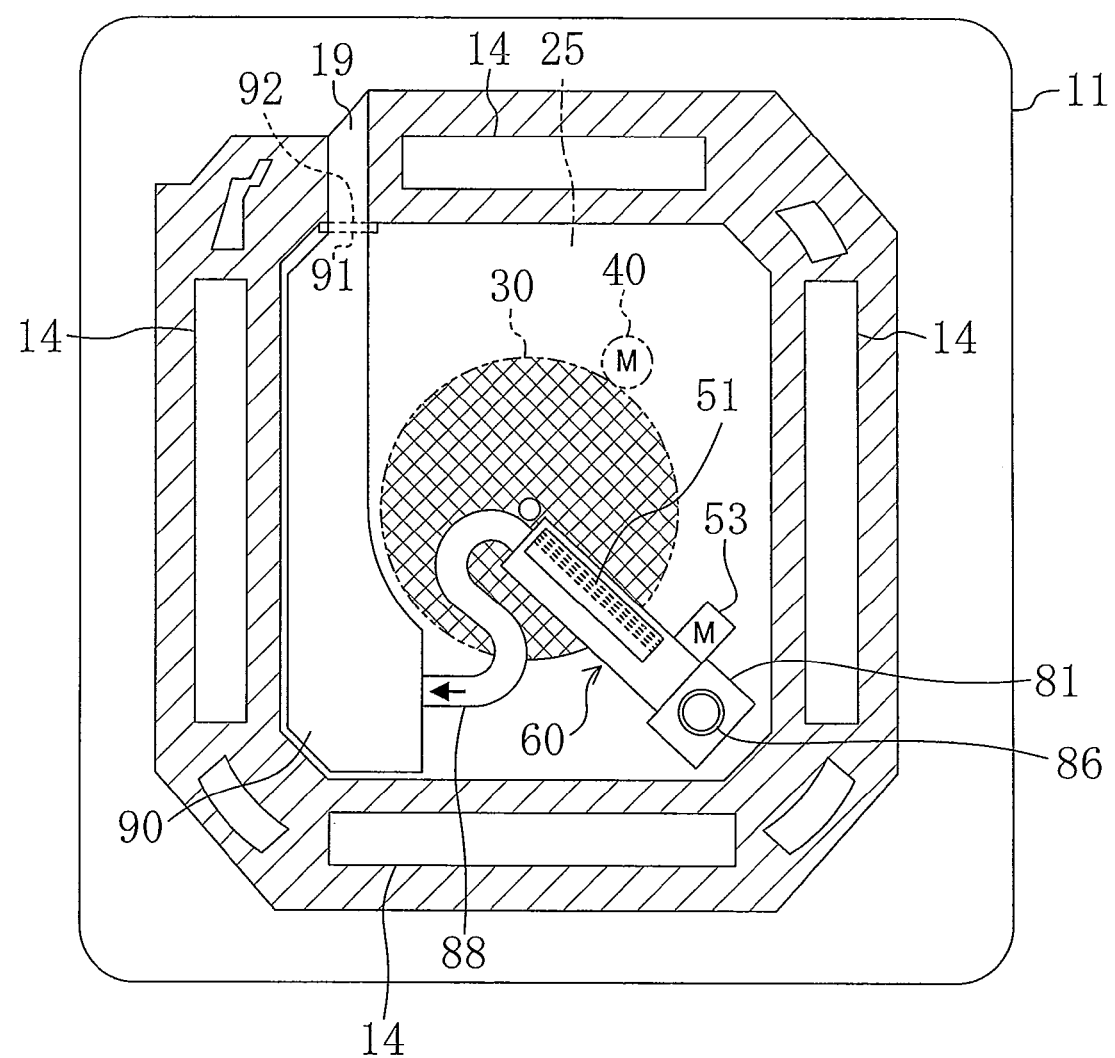
FIG. 2 is a horizontal cross section of the indoor unit of the embodiment.

As shown in FIG. 1-2, the indoor unit (1) includes a casing (20), and the casing (20) is formed by a main body casing (10) in the shape of a substantially rectangular parallelepiped box, and a rectangular plate-shaped decorative panel (11). The main body casing (10) is placed above the ceiling. The main body casing (10) includes an upper casing (10a), and a lower casing (10b) attached to the lower part of the upper casing (10a). A heat insulator (17) is laminated on the inner surface of the upper casing (10a).

The decorative panel (11) is attached to the main body casing (10) so as to cover the lower side of the main body casing (10). In this state, the front face (the lower face) of the decorative panel (11) is exposed to the room, and an outer peripheral portion of the back face (the upper face) of the decorative panel (11) is in contact with a ceiling board (16).

The decorative panel (11) has an inlet (13) and an outlet (14). The inlet (13) is formed in the central part of an inlet grille (12) of the decorative panel (11). The inlet (13) is formed by a plurality of slits, and the overall shape of the inlet (13) is substantially square.

Figure 3:
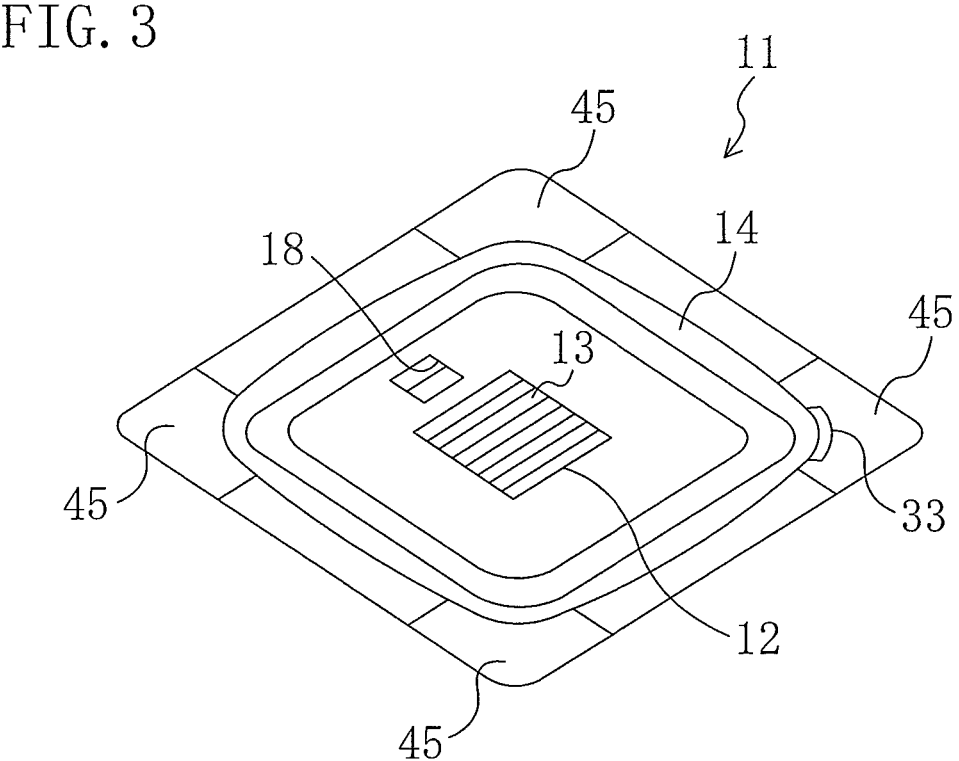
FIG. 3 is a perspective view of a decorative panel of the embodiment as viewed obliquely from below.

The outlet (14) is formed between the inlet grille (12) and the outer peripheral portion of the decorative panel (11). As shown in FIG. 3, the outlet (14) is formed along the entire outer periphery of the decorative panel (11). In this indoor unit (1), the outlet (14) is formed not only along each side of the outer periphery of the decorative panel (11), but also along each corner. The inlet grille (12) has an insertion hole (18) for removing dust from a dust storing portion (60, 90) described below.

As shown in FIG. 3, each corner of the decorative panel (11) is formed by a corner panel (45). Each corner panel (45) is detachable from a main body of the decorative panel (11). A lighting portion (33), which is turned on by control of a control portion (35) described below, is attached to one of the four corner panels (45). The lighting portion (33) includes a light emitting portion formed by three light emitting diodes (LEDs), and a light diffusing portion made of a transparent acrylic resin. The light emitting portion is formed by two green LEDs and one red LED. One end face of the lighting portion (33) is an exposed portion that is exposed to the room. In the lighting portion (33), light that is emitted from the light emitting portion is incident on the light diffusing portion, and the light incident on the light diffusing portion is emitted from the exposed portion of the light diffusing portion.

Figure 4:
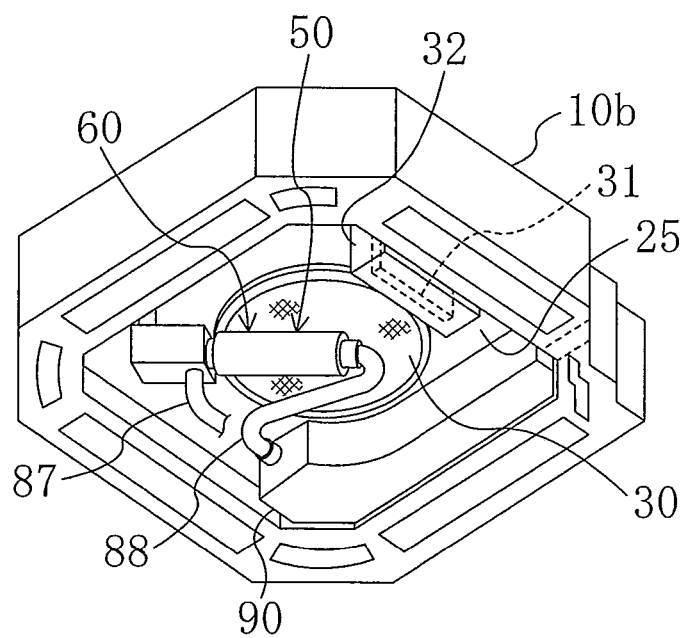
FIG. 4 is a perspective view of a lower casing of the embodiment as viewed obliquely from below.

As shown in FIG. 1, the indoor heat exchanger (22), a drain pan (23), and an indoor fan (21) are provided in the upper casing (10a). As shown in FIGS. 2 and 4, the air filter (30), a filter drive portion (40), a brush unit (50), a dust collecting container (60), and a dust storing container (90) are provided in the lower casing (10b). The filter drive portion (40) and the brush unit (50) form a dust removing portion (40, 50). The dust collecting container (60) and the dust storing container (90) form the dust storing portion (60, 90). In the dust storing portion (60, 90), the dust collecting container (60) is a first container, the dust storing container (90) is a second container, and dust is transferred from the first container to the second container.

The indoor fan (21) is a so-called turbo fan. The indoor fan (21) is positioned near the center of the upper casing (10a). The indoor fan (21) includes a fan motor (21a) and an impeller (21b). The fan motor (21a) is fixed to a top plate of the upper casing (10a). The impeller (21b) is coupled to a rotating shaft of the fan motor (21a). A bell mouth (24) is provided below the indoor fan (21) so as to communicate with the inlet (13). The indoor fan (21) is configured to circumferentially blow air drawn from below through the bell mouth (24).

The indoor heat exchanger (22) is configured as a cross-fin type fin-and-tube heat exchanger. The indoor heat exchanger (22) is formed in a rectangle as viewed in plan, and is positioned so as to surround the indoor fan (21). The indoor heat exchanger (22) exchanges heat between room air blown by the indoor fan (21) and a refrigerant.

The drain pan (23) is provided below the indoor heat exchanger (22). The drain pan (23) serves to receive drainage water produced by condensation of moisture in the air in the indoor heat exchanger (22). The drain pan (23) is provided with a drain pump for draining the drainage water (not shown).

The air filter (30) serves to capture dust contained in the air flowing from the inlet (13) toward the bell mouth (24). The air filter (30) has a disc shape. The air filter (30) is attached so as to cover a circular air hole that is formed in a partition plate (25) provided at the upper end of the lower casing (10b). The air filter (30) is rotatably attached to the center of ribs (not shown) that divide the air hole of the partition plate (25) into four. A filter gear portion is formed on the outer peripheral surface of the air filter (30) (not shown).

The filter drive portion (40) includes a motor, and a motor gear portion that is rotated by the motor. The filter drive portion (40) is provided outside the air filter (30) so that the motor gear portion meshes with the filter gear portion. The filter drive portion (40) rotates the air filter (30) by rotation of the motor in a cleaning operation of removing dust from the air filter (30) by the brush unit (50) described below.

The brush unit (50) serves to remove dust captured by the air filter (30). The brush unit (50) is attached to the dust collecting container (60) described below. The brush unit (50) includes a rotating brush (51) that is in contact with the air filter (30), and a brush drive portion (53) for rotating the rotating brush (51). In the brush unit (50), the brush drive portion (53) rotates the rotating brush (51) in the cleaning operation.

Figure 5:
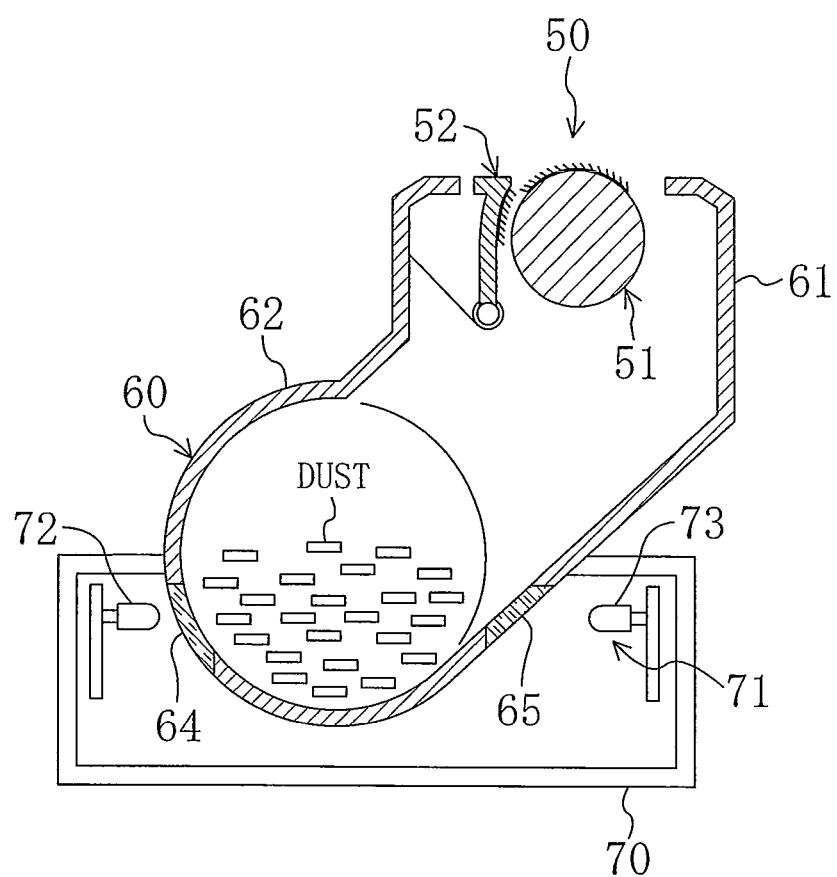
FIG. 5 is a cross sectional view of a dust collecting container of the embodiment.

As shown in FIG. 5, the upper part of the dust collecting container (62) serves as an accommodating portion (61) for accommodating the brush unit (50), and the lower part of the dust collecting container (62) serves as a storing portion (60) for storing dust removed from the air filter (30). The storing portion (60) is provided with a first window (64) and a second window (65), each formed by a transparent member, so that the first window (64) and the second window (65) face an LED (72) and a phototransistor (73), respectively. Dust removed from the air filter (30) by the rotating brush (51), and dust removed from the rotating brush (51) by a cleaning brush (52) provided in the accommodating portion (61) are stored in the storing portion (60).

A damper box (81), which has a first chamber and a second chamber therein, is connected to the dust collecting container (60). As shown in FIG. 1, the damper box (81) is provided with a damper (82) for opening and closing a communication hole between the first chamber and the second chamber. An introducing duct (86), which has an opening positioned above the bell mouth (24), is connected to the upper surface of the first chamber. When the indoor fan (21) is operated with the damper (82) being opened, air blown by the indoor fan (21) flows into the dust collecting container (60) through the introducing duct (86) and the damper box (81). Thus, dust in the dust collecting container (60) is transferred to the dust storing container (90). Note that the damper (82) is kept open during the air conditioning operation.

An intake duct (87), which communicates with the insertion hole (18), is connected to the lower surface of the second chamber of the damper box (81). By operating a cleaner with a dust inlet of the cleaner being connected to the insertion hole (18), dust in the dust storing container (90) and the dust collecting container (60) is drawn into the cleaner.

The dust storing container (90) is positioned below the air filter (30), and is connected to the dust collecting container (60) via a transfer duct (88). The dust storing container (90) has an air discharge port (91). A filter (92) is attached to the air discharge port (91). The air discharge port (91) communicates with the outside of the casing (20) through an air discharge passage (19) of the lower casing (10*b*).

In the present embodiment, as shown in FIG. 5, a detection sensor (71) for detecting the amount of dust stored in the dust collecting container (62) is provided for the dust collecting container (62). The detection sensor (71) is formed by an optical sensor. The detection sensor (71) is accommodated in a sensor box (70) that is attached to the storing portion (60) of the dust collecting container (62).

The detection sensor (71) includes a pair of components that are positioned at the same height, namely the LED (72) and the phototransistor (73). The LED (72) and the phototransistor (73) are provided at a height slightly lower than that of the center of the storing portion (60). In the detection sensor (71), light emitted from the LED (72) sequentially passes through the first window (64) and the second window (65), and luminosity of the light that has passed through the first window (64) and the second window (65) is detected by the phototransistor (73). The luminosity detected by the phototransistor (73) is output to the control portion (35) described below. The detection sensor (71) detects that dust is stored up to the height of the detection sensor (71) in the dust collecting container (62), when the detected luminosity is equal to or lower than a criteria value described below.

[Configuration of Control Portion]

The indoor unit (1) of the present embodiment is provided with the control portion (35) for controlling the air conditioning operation and the cleaning operation. The control portion (35) is provided on a control substrate (31) in a control box (32) that accommodates the lower casing (10*b*). The control portion (35) together with the detection sensor (71) forms an output control portion.

The indoor unit (1) is provided with a cleaning signal output portion (33, 48) for outputting a cleaning signal for notifying the user of the need to remove dust from the dust storing portion (60, 90). The cleaning signal output portion (33, 48) is formed by the lighting portion (33) of the decorative panel (11), and a remote control (48) that is operated by the user to turn on/off the power supply, or the like. The cleaning signal output portion (33, 48) is controlled by the control portion (35). Note that the cleaning signal output portion (33, 48) is configured so as to be able to output four kinds of cleaning signals, namely a caution signal, a warning signal, a first abnormal signal, and a second abnormal signal. These cleaning signals are output in different ways from each other.

Figure 6:
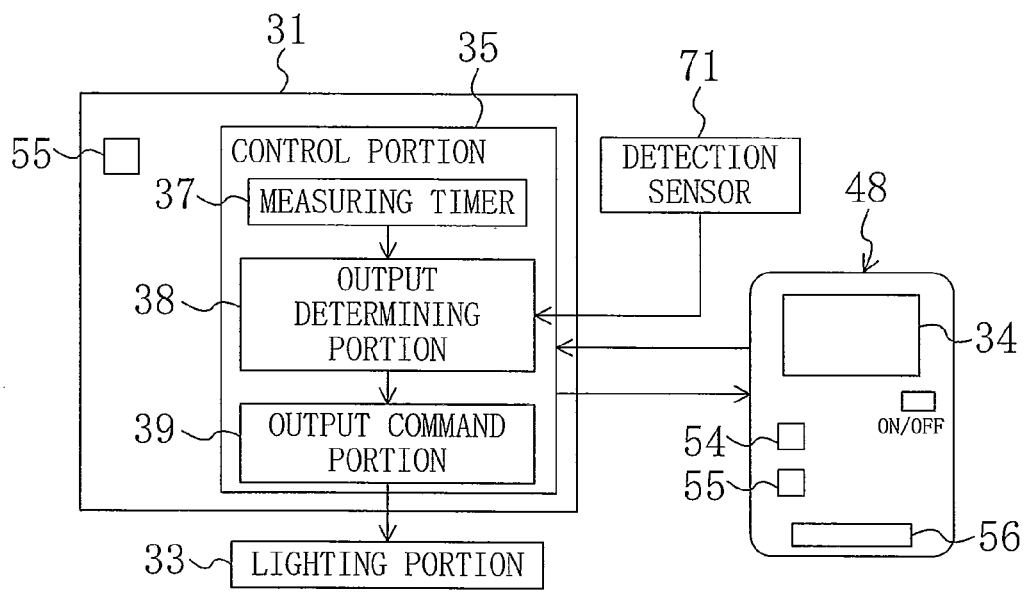
FIG. 6 is a schematic configuration diagram of an output control portion of the embodiment.

As shown in FIG. 6, the remote control (48) is provided with a liquid crystal display portion (34) for displaying a preset temperature and the like, a reset button (55) that forms an inhibition termination input portion, and a remote control lighting portion (56) that is formed by an LED. Note that the reset button (55) is also provided on the control substrate (31) of the control portion (35).

The control portion (35) is configured to determine whether to output the cleaning signal, and to control the cleaning signal output portion (33, 48) to output the cleaning signal when it is determined that the cleaning signal should be output. As shown in FIG. 6, the control portion (35) includes a measuring timer (37), an output determining portion (38), and an output command portion (39).

The measuring timer (37) is configured to measure an accumulated operation time of the indoor fan (21). When it is detected that the luminosity detected by the phototransistor (73) changes from a value equal to or lower than the criteria value described below to a value larger than the criteria value, the measuring timer (37) is reset as it is determined that dust has been removed from the dust storing portion (60, 90). The measuring timer (37) is also reset when the reset button (55) is pressed with the detected luminosity being higher than the criteria value. The measuring timer (37) measures a first accumulated time, which is an accumulated operation time of the indoor fan (21) after the previous removal of dust from the dust storing portion (60, 90) (if the indoor unit (21) has just been installed, the measuring timer (37) measures an accumulated operation time of the indoor fan (21) after the installation of the indoor unit (21)).

The output determining portion (38) is configured to determine whether to output the caution signal, based on the time (the first accumulated time) measured by the measuring timer (37). A preset initial value (e.g., 8,760 hours=one year) of a reference time Tsd, which is used to determine whether to output the caution signal, is stored in the output determining portion (38). The output determining portion (38) decides to output the caution signal if the time measured by the measuring timer (37) reaches the reference time Tsd.

The output determining portion (38) is also configured to determine whether to output the warning signal, based on the luminosity detected by the phototransistor (73). A preset criteria value of the luminosity, which is used to determine whether to output the warning signal, is stored in the output determining portion (38). The output determining portion (38) decides to output the warning signal if the detected luminosity becomes equal to or lower than the criteria value. Note that the output determining portion (38) reads the luminosity detected by the phototransistor (73) every time a dust transfer operation described below is completed, and reads the detected luminosity at regular intervals after the warning signal is output.

The control portion (35) of the present embodiment is configured to perform a dust transfer operation of transferring dust in the dust collecting container (60) to the dust storing container (90), by operating the indoor fan (21) with the damper (82) being opened, so that the luminosity detected by the phototransistor (73) does not become equal to or lower than the criteria value before the dust storing container (90) becomes full. More specifically, the control portion (35) performs the dust transfer operation every time the cleaning operation is completed. Thus, at the time the output determining portion (38) has decided to output the warning signal, the dust storing container (90) is full unless the transfer duct (88) is clogged, and thus the dust collected in the dust collecting container (60) cannot be transferred to the dust storing container (90). In the present embodiment, the amount of stored dust corresponding to the warning signal is defined as a first level. The first level is such a level that the dust collecting container (60) is still not full and is still able to store more dust.

The output determining portion (38) is also configured to determine whether to output the first abnormal signal. The output determining portion (38) determines whether to output the first abnormal signal, based on a second accumulated time, which is an accumulated operation time of the indoor fan (21) after it is determined that the amount of stored dust has reached the first level. More specifically, the output determining portion (38) stores the time measured by the measuring timer (37) when it is determined that the amount of stored dust has reached the first level. The output determining portion (38) calculates the second accumulated time from the difference between the current measured time of the measuring timer (37) and the stored time, and decides to output the first abnormal signal when the second accumulated time reaches a predetermined first criteria value T1. Note that the first criteria value T1 is calculated by the following expression (1), where A represents a predetermined first coefficient (e.g., A=0.04).

$$T1 = Tsd \times A \qquad \text{Expression (1)}$$

Figure 7:
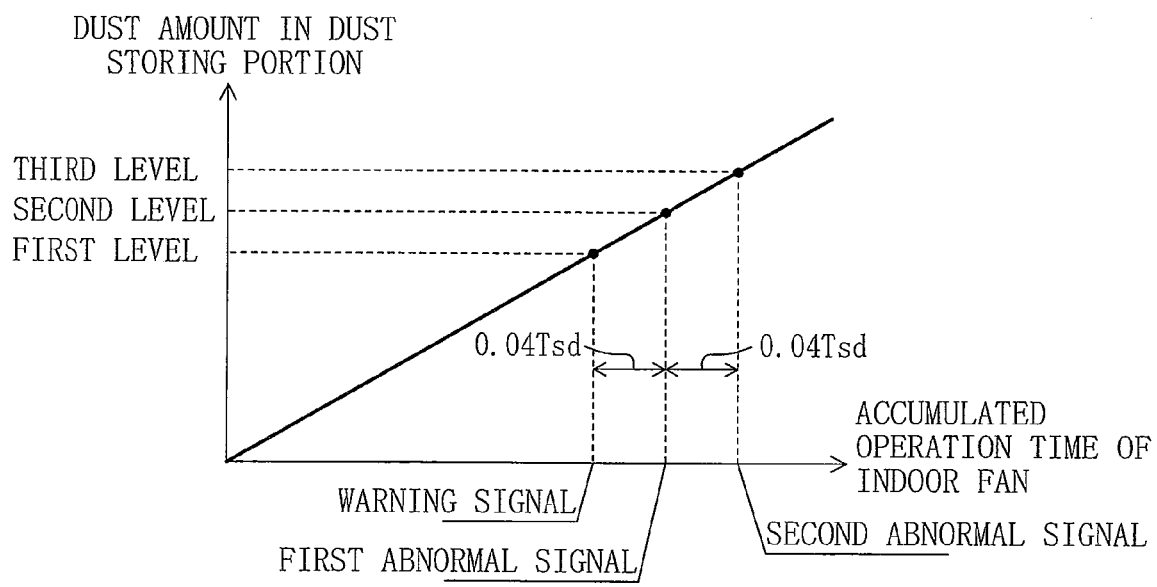
FIG. 7 is a graph showing the relation between a cleaning signal of each level and the amount of dust in a dust storing portion in the indoor unit of the embodiment.

In the present embodiment, as shown in FIG. 7, the amount of stored dust corresponding to the first abnormal signal is defined as a second level that is higher than the first level. The second level is determined so as to correspond to a state where the dust collecting container (60) is almost full, and the brush unit (50) and the like do not fail, but the performance of the brush unit (50) and the like starts to degrade. After the amount of stored dust reaches the second level, dust may drop from the dust collecting container (60) into the room, and/or dust may not be completely removed from the air filter (30) by the cleaning operation.

The output determining portion (38) is also configured to determine whether to output the second abnormal signal. The output determining portion (38) determines whether to output the second abnormal signal, based on a third accumulated time, which is an accumulated operation time of the indoor fan (21) after it is determined that the amount of stored dust has reached the second level. More specifically, the output determining portion (38) stores the time measured by the measuring timer (37) when it is determined that the amount of stored dust has reached the second level. The output determining portion (38) calculates the third accumulated time from the difference between the current measured time of the measuring timer (37) and the stored time, and decides to output the second abnormal signal when the third accumulated time reaches a predetermined second criteria value T2. Note that the second criteria value T2 is calculated by the following expression (2), where B represents a predetermined second coefficient (e.g., B=0.04). The second coefficient has the same value as that of the first coefficient.

$$T2 = Tsd \times B \qquad \text{Expression (2)}$$

In the present embodiment, the amount of stored dust corresponding to the second abnormal signal is defined as a third level that is higher than the second level. The third level is determined so as to correspond to a state where the amount of dust in the dust collecting container (60) is so large that the brush unit (50) and the like can fail. After the amount of stored dust reaches the third level, the brush unit (50) may not rotate, dust may drop from the dust collecting container (60), and/or dust in the dust storing portion (60, 90) may not be able to be collected through the insertion hole (18) by the cleaner.

The output command portion (39) commands the cleaning signal output portion (33, 48) to output the caution signal when the output determining portion (38) decides to output the caution signal. In the case of the caution signal, the cleaning signal is output only from the remote control (48). A message, which encourages the user to remove dust from the dust storing portion (60, 90), is displayed on the remote control (48) in response to the output command from the output command portion (39). More specifically, a message "please clean the dust box" is displayed on the liquid crystal display portion (34).

The output command portion (39) commands the cleaning signal output portion (33, 48) to output the warning signal when the output determining portion (38) decides to output the warning signal. In the case of the warning signal, the cleaning signal is output from both the lighting portion (33) and the remote control (48). In the lighting portion (33), the red LED of the light emitting portion is turned on in response to the output command from the output command portion (39). In the remote control (48), the message "please clean the dust box" is displayed on the liquid crystal display portion (34) in response to the output command from the output command portion (39), as in the case of the caution signal.

Note that when the user presses the reset button (55), the output command portion (39) commands the cleaning signal output portion (33, 48) to stop outputting the warning signal. Thus, the red LED of the lighting portion (33) is turned off. As long as the detected luminosity is equal to or lower than the criteria value, the output command portion (39) commands the cleaning signal output portion (33, 48) to output the warning signal every time the accumulated operation time of the indoor fan (21) after the last press of the reset button (55) reaches a predetermined third criteria value T3 (e.g., two hours). Note that the third criteria value T3 is smaller than the first criteria value T1 and the second criteria value T2.

The output command portion (39) commands the cleaning signal output portion (33, 48) to output the first abnormal signal when the output determining portion (38) decides to output the first abnormal signal. In the case of the first abnormal signal, the cleaning signal is output from both the lighting portion (33) and the remote control (48). In the lighting portion (33), the red LED of the light emitting portion flashes in response to the output command from the output command portion (39). In the remote control (48), the message "please clean the dust box" is displayed on the liquid crystal display portion (34), and the remote lighting portion (56) flashes, in response to the output command from the output command portion (39).

In the present embodiment, the control portion (35) is configured to inhibit the air conditioning operation and the cleaning operation when the output determining portion (38) decides to output the first abnormal signal. As soon as the first abnormal signal is output, the indoor unit (1) goes into an air conditioning inhibited state where the air conditioning operation is inhibited, and a cleaning inhibited state where the cleaning operation is inhibited. After the air conditioning operation is inhibited, the user is encouraged to clean the dust storing portion (60, 90).

If the reset button (55) is pressed in this state, the output command portion (39) commands the cleaning signal output portion (33, 48) to stop outputting part of the first abnormal signal. Moreover, the control portion (35) temporarily terminates the air conditioning inhibited state and the cleaning inhibited state even if the dust storing portion (60, 90) has not been cleaned. Thus, the lighting portion (33) and the remote control lighting portion (56) are turned off. Note that the cleaning signal continues to be displayed on the liquid crystal display portion (34). In this state, the indoor unit (1) is able to perform the air conditioning operation and the cleaning operation.

As long as the detected luminosity is equal to or lower than the criteria value, the output command portion (39) again commands the lighting portion (33) and the remote control lighting portion (56) to flash, and the control portion (35) again inhibits the air conditioning operation and the cleaning operation, every time the accumulated operation time of the indoor fan (21) after the last press of the reset button (55) reaches the third criteria value T3. The air conditioning inhibited state and the cleaning inhibited state are terminated only while the lighting portion (33) and the remote control lighting portion (56) are stopped from flashing.

When the output determining portion (38) decides to output the second abnormal signal, the output command portion (39) commands the cleaning signal output portion (33, 48) to output the second abnormal signal, and displays on the remote control (48) an abnormal code that indicates that the dust storing portion (60, 90) is in an abnormal condition. In the case of the second abnormal signal, the cleaning signal is output from both the lighting portion (33) and the remote control (48). In the lighting portion (33), the red LED of the light emitting portion flashes in response to the output command from the output command portion (39). In the remote control (48), the remote control lighting portion (56) flashes, and the abnormal code is displayed on the liquid crystal display portion (34). In addition to the abnormal code, contact information of a service center for maintenance of the air conditioner is displayed on the liquid crystal display portion (34).

Note that in the present embodiment, the control portion (35) is configured to keep inhibiting the air conditioning operation and the cleaning operation even after the second abnormal signal is output. If the air conditioning operation inhibited state and the cleaning operation inhibited state have been temporarily terminated in response to the press of the reset button (55), the indoor unit (1) goes into the air conditioning inhibited state and the cleaning operation inhibited state as soon as the second abnormal signal is output.

If the user presses the reset button (55) in this state, the output command portion (39) commands the cleaning signal output portion (33, 48) to stop outputting the second abnormal signal. Moreover, the control portion (35) temporarily terminates the air conditioning inhibited state even if the dust storing portion (60, 90) is not cleaned. In the present embodiment, only the air conditioning inhibited state is terminated, and the cleaning inhibited state can be terminated only before the output determining portion (38) decides to output the second abnormal signal. Once the output determining portion (38) decides to output the second abnormal signal, the control portion (35) does not terminate the cleaning inhibited state unless the dust storing portion (60, 90) is cleaned, even if the reset button (55) is pressed. Thus, the lighting portion (33) and the remote lighting portion (56) are turned off. The abnormal code continues to be displayed on the liquid crystal display portion (34). In this state, the indoor unit (1) is able to perform the air conditioning operation.

As long as the detected luminosity is equal to or lower than the criteria value, the output command portion (39) again commands the lighting portion (33) and the remote control lighting portion (56) to flash, and the control portion (35) again inhibits the air conditioning operation, every time the accumulated operation time of the indoor fan (21) after the last press of the reset button (55) reaches the third criteria value T3. The air conditioning inhibited state is terminated only while the lighting portion (33) and the remote control lighting portion (56) are stopped from flashing.

In the present embodiment, the measuring timer (37) is reset in response to the press of the reset button (55) by the user before the warning signal is output. If any cleaning signal has been output at this time, this cleaning signal is terminated. After the warning signal is output, the luminosity detected by the phototransistor (73) exceeds the criteria value if the user removes dust from the dust storing portion (60, 90), whereby the measuring timer (37) is automatically reset. If any cleaning signal has been output at this time, this cleaning signal is terminated.

In the present embodiment, the control portion (35) is configured to keep the two green LEDs of the lighting portion (33) in an ON state during the air conditioning operation, and to cause the two green LEDs of the lighting portion (33) to flash during the cleaning operation. The remote control (48) is provided with a lighting operation button (54) so that the user can choose whether to turn on the lighting portion (33). Each time the lighting operation button (54) is pressed, the control portion (35) is switched between a first setting in which the lighting portion (33) is on during the air conditioning operation and the cleaning operation, and a second setting in which the lighting portion (33) is not turned on during the air conditioning operation and the cleaning operation. Note that even if the control portion (35) is in the second setting, the control portion (35) turns on the lighting portion (33) if the output determining portion (38) decides to output the warning signal, the first abnormal signal, and the second abnormal signal.

In the present embodiment, the indoor unit (1) has a learning function to learn the reference time Tsd so that the reference time Tsd is changed according to the amount of dust contained in the air in the room where the indoor unit (1) is installed. More specifically, the output determining portion (38) changes the reference time Tsd to a larger value if it decides to output the caution signal before deciding to output the warning signal. In this case, the reference time Tsd is changed to a value Tsd' obtained by the following expression (3), where Tsd represents an original reference time, Tsd' represents a reference value to which the reference time Tsd is changed, and C represents a third coefficient larger than 1 (e.g., C=1.2).

$$Tsd'=Tsd \times C \quad \text{Expression (3)}$$

The output determining portion (38) changes the reference time Tsd to a smaller value if it decides to output the warning signal before deciding to output the caution signal. In this case, the reference time Tsd is changed to a value Tsd' obtained by the following expression (4), where D represents a fourth coefficient less than 1 (e.g., D=0.7).

$$Tsd'=Tsd \times D \quad \text{Expression (4)}$$

Note that an upper limit (e.g., 10,800 hours) and a lower limit (e.g., 900 hours) of the reference time Tsd are stored in output determining portion (38). If the reference time Tsd' exceeds the upper limit, the reference time Tsd' is set to the upper limit. If the reference time Tsd' becomes less than the lower limit, the reference time Tsd' is set to the lower limit This prevents the reference time Tsd from being adjusted to an excessively small or large value due to detection errors of the detection sensor (71) or the like.

In the present embodiment, in a room environment having a relatively large amount of dust in the air, dust is stored in the dust storing portion (60, 90) in a relatively short time, and thus the warning signal is output in a relatively short time after dust is removed from the dust storing portion (60, 90). In this case, the reference time Tsd is adjusted to a small value by the learning function. On the other hand, in a room environment having a relatively small amount of dust in the air, the warning signal is output in a relatively long time after dust is removed from the dust storing portion (60, 90). In this case, the reference time Tsd is adjusted to a large value by the learning function. As described above, in the present embodiment, since the reference time Tsd is adjusted according to when the warning signal is output, the reference time Tsd is adjusted to a value corresponding to the amount of dust contained in the air in the room. Thus, the caution signal is output at an appropriate time.

The first criteria time T1, which is used to determine whether to output the first abnormal signal, and the second criteria time T2, which is used to determine whether to output the second abnormal signal, are calculated from the reference time Tsd. Thus, the first criteria time T1 and the second criteria time T2 are changed according to the change in reference time Tsd. More specifically, in a room environment having a relatively large amount of dust in the air, the first criteria time T1 and the second criteria time T2 are adjusted to smaller values, and in a room environment having a relatively small amount of dust in the air, the first criteria time T1 and the second criteria time T2 are adjusted to larger values. Like the reference time Tsd, the first criteria time T1 and the second criteria time T2 are changed to values corresponding to the amount of dust contained in the air in the room. Thus, the first abnormal signal and the second abnormal signal are output at appropriate times.

Note that a lower limit (e.g., 100 hours) of the first criteria time T1 and a lower limit (e.g., 100 hours) of the second criteria time T2 are stored in the output determining portion (38). If the adjusted first and second criteria times T1, T2 become lower than the lower limits, the first and second criteria times T1, T2 are set to the lower limits. This prevents the first and second criteria times T1, T2 from being adjusted to excessively small values.

Advantages of Embodiment

In the present embodiment, the output control portion (35, 71) is provided which controls the cleaning signal output portion (33, 48) to output the cleaning signal when it is determined that the amount of dust in the dust storing portion (60, 90) has reached the first level, when it is determined that the amount of dust in the dust storing portion (60, 90) has reached the second level, and when it is determined that the amount of dust in the dust storing portion (60, 90) has reached the third level, whereby the cleaning signal is output at the three levels corresponding to different amounts of dust from each other. Thus, different kinds of the cleaning signal are sequentially output as the amount of dust in the dust storing portion (60, 90) increases. This enables the user to recognize stepwise the level of dust stored in the dust storing portion (60, 90), and thus enables the user to recognize stepwise the urgency of the need to clean the dust storing portion (60, 90), whereby the user can flexibly clean the dust storing portion (60, 90).

In the present embodiment, the cleaning signal of the first level is output before the air conditioning operation is inhibited at the second level. Incidentally, even in conventional indoor units that output only a cleaning signal corresponding to one level of the amount of dust, the air conditioning operation is inhibited in response to the output of the cleaning signal. In this case, no cleaning signal is output until the air conditioning operation is inhibited. In the present embodiment, however, the cleaning signal of the first level is output before the air conditioning operation is inhibited at the second level. Thus, the user can recognize from the cleaning signal of the first level that the air conditioning operation will soon be inhibited.

In the present embodiment, the cleaning signal of the first level is output before the cleaning operation is inhibited at the second level. Incidentally, even in the conventional indoor units that output only a cleaning signal corresponding to one level of the amount of dust, the cleaning operation is inhibited in response to the output of the cleaning signal. In this case, no cleaning signal is output until the cleaning operation is inhibited. In the present embodiment, however, the cleaning signal of the first level is output before the cleaning operation is inhibited at the second level. Thus, the user can recognize from the cleaning signal of the first level that the cleaning operation will soon be inhibited.

In the present embodiment, once the cleaning signal of the third level is output, the cleaning inhibited state cannot be terminated even if the reset button (55) is pressed, so that no dust is stored in the dust storing portion (60, 90) by the cleaning operation. This can reduce or eliminate problems caused by an excessive amount of dust in the dust storing portion (60, 90).

In the present embodiment, since the output of the detection sensor (71) is used to determine if the amount of dust in the dust storing portion (60, 90) has reached the first level or not, whether the amount of dust in the dust storing portion (60, 90) has reached the first level or not can be relatively accurately detected. Unlike wall-mounted indoor units designed for home use, the ceiling-mounted indoor unit (1) is installed in various room environments having different amounts of dust. Thus, the cleaning signal may not be able to be accurately output if, e.g., the accumulated operation time of the indoor unit is used to determine when to output the cleaning signal. In the present embodiment, however, the output of the detection sensor (71) is used to determine when to output the warning signal, which is one of the cleaning signals. Thus, the cleaning signal of the first level can be output at an appropriate time in terms of the amount of dust in the dust storing portion (60, 90).

In the present embodiment, the accumulated operation time of the indoor fan (21) is used to determine if the amount of dust in the dust storing portion (60, 90) has reached the second level or not. This eliminates the need to provide a detection sensor (71) in addition to the detection sensor (71) for determining if the amount of dust has reached the first level or not. This can simplify the configuration of the indoor unit (1). Note that the accumulated operation time of the air conditioner can be used instead of the accumulated operation time of the indoor fan (21).

In the present embodiment, the accumulated operation time of the indoor fan (21) is used to determine if the amount of dust in the dust storing portion (60, 90) has reached the third level or not. This eliminates the need to provide a detection sensor (71) in addition to the detection sensor (71) for determining if the amount of dust has reached the first level or not. This can simplify the configuration of the indoor unit (1). Note that the accumulated operation time of the air conditioner can be used instead of the accumulated operation time of the indoor fan (21).

In the present embodiment, different kinds of the cleaning signal are output according to the level of the amount of dust at which the cleaning signal is output, so that the dust level of the cleaning signal can be identified. This enables the user to easily recognize the dust level of the cleaning signal.

In the present embodiment, the abnormal code is output together with the cleaning signal that indicates the greatest urgency of the need to clean the dust storing portion (60, 90). This enables the user to reliably recognize the urgent need to clean the dust storing portion (60, 90).

In the present embodiment, the cleaning signal is output not only when it is determined from the output of the detection sensor (71) that the amount of dust in the dust storing portion (60, 90) has reached a predetermined level, but also when the time measured by the measuring timer (37) has reached a predetermined reference value. This enables the user to recognize the need to clean the dust storing portion (60, 90), even if the detection sensor (71) fails.

Modification of Embodiment

In the modification, the control portion (35) inhibits only the cleaning operation out of the air conditioning operation and the cleaning operation in response to the output of the first abnormal signal. That is, only the cleaning operation is inhibited when the amount of dust in the dust storing portion (60, 90) reaches the second level. Note that when the user presses the reset button (55), the cleaning inhibited state (the state where the cleaning operation is inhibited) is temporarily terminated as in the above embodiment.

After the first abnormal signal is output, the control portion (35) controls the cleaning signal output portion (33, 48) to output the second abnormal signal, if it is determined based on the time measured by the measuring timer (37) of a clogging detecting section (37), that the air filter (30) has been clogged to a predetermined extent. More specifically, the control portion (35) controls the cleaning signal output portion (33, 48) to output the second abnormal signal if the third accumulated time, which is the accumulated operation time of the indoor fan (21) after the first abnormal signal is output, reaches a predetermined fourth criteria value T4. The control portion (35) inhibits not only the cleaning operation but also the air conditioning operation as soon as the second abnormal signal is output. Note that if the user presses the reset button (55), the cleaning inhibited state and the air conditioning inhibited state are temporarily terminated.

After the second abnormal signal is output, the control portion (35) controls the cleaning signal output portion (33, 48) to output a third abnormal signal when a fourth accumulated time, which is the accumulated operation time of the indoor fan (21) after the second abnormal signal is output, reaches a predetermined fifth criteria value T5. The fifth criteria value T5 is determined so that the amount of dust in the dust storing portion (60, 90) at the time the third abnormal signal is output is about the same as the third level of the above embodiment. The control portion (35) inhibits the cleaning operation and the air conditioning operation again as soon as the third abnormal signal is output. After the third abnormal signal is output, the cleaning inhibited state is not terminated even if the reset button (55) is pressed, and only the air conditioning inhibited state is temporarily terminated.

In this modification, the air conditioning operation can be performed even after the amount of dust in the dust storing portion (60, 90) reaches the second level and the cleaning operation is inhibited. Thus, the state where the air conditioning operation can be performed is maintained as long as possible, thereby reducing or eliminating the possibility that the room becomes less comfortable immediately after the amount of dust in the dust storing portion (60, 90) reaches the second level.

Note that a wind speed sensor for measuring the wind speed of the air that has passed through the air filter (30) may be provided as the clogging detection section (37), instead of the measuring timer (37). Both the measuring timer (37) and the wind speed sensor may be used as the clogging detection section (37). For example, the wind speed sensor is provided between the air filter (30) and the bell mouth (24). In this case, the control portion (35) outputs the second abnormal signal and inhibits the air conditioning operation when the detected value of the wind speed sensor becomes lower than a predetermined criteria value.

Other Embodiments

The above embodiment may be configured as follows.

In the above embodiment, the cleaning signal output portion (33, 48) may be configured to generate voice sounds as the cleaning signal.

As described above, the message "please clean the dust box" is displayed on the liquid crystal display portion (34) of the above embodiment as the cleaning signal. However, as shown in, e.g., FIGS. 8A-8B, a picture may be displayed on the liquid crystal display portion (34) so that the user or the like recognizes the need to clean the dust storing portion (60, 90). In this example, a picture showing the state immediately before the dust inlet of the cleaner is inserted into the insertion hole of the indoor unit (1) (FIG. 8A), and a picture showing the state where the dust inlet of the cleaner is inserted into the insertion hole (18) of the indoor unit (1) (FIG. 8B) are displayed, e.g., alternately on the liquid crystal display portion (34). This enables the user or the like to recognize the need to clean the dust storing portion (60, 90), and to easily figure out how to clean the dust storing portion (60, 90). Note that both the picture shown in FIGS. 8A-8B and the message "please clean the dust box" may be displayed on the liquid crystal display portion (34) as the cleaning signal.

In the above embodiment, the output determining portion (38) may use a first correction time to determine whether to output the caution signal, instead of using the time measured by the measuring timer (37). The first correction time is the measured time corrected so as to be increased as the rotating speed of the indoor fan (21) increases. Note that instead of correcting the time measured by the measuring timer (37), the reference time Tsd may be corrected according to the rotating speed of the indoor fan (21) so that the reference time Tsd is reduced as the rotating speed of the indoor fan (21) increases.

In the above embodiment, the output determining portion (38) may use a second correction time to determine whether to output the first abnormal signal and the second abnormal signal, instead of using the accumulated operation time of the indoor fan (21) after it is determined that the amount of dust has reached the first or second level. The second correction time is the accumulated operation time corrected so as to be increased as the rotating speed of the indoor fan (21) increases.

In the above embodiment, the reference time may be learned so that the reference time is changed to the time measured by the measuring timer (37) at the time the output determining portion (38) decides to output the warning signal.

In the above embodiment, the dust transfer operation may be performed while performing the cleaning operation. In this case, the dust collecting container (60) functions as a dust passage, and dust removed from the air filter (30) is transferred directly to the dust storing container (90) without being temporarily stored in the dust collecting container (60).

In the above embodiment, the dust removing portion may be configured as a drawing apparatus for drawing dust on the air filter (30) like a cleaner. In this case as well, the dust collecting container (60) functions as a dust passage.

In the above embodiment, the indoor unit (1) may be a wall-mounted indoor unit that is commonly used at home.

Note that the above embodiments are essentially preferable examples, and are not intended to limit the scope of the present invention, its applications, or its uses.

INDUSTRIAL APPLICABILITY

As described above, the present invention is useful for indoor units of air conditioners for air conditioning a room.

The invention claimed is:

1. An indoor unit of an air conditioner, comprising:
   a casing having an inlet and an outlet;
   an indoor fan that blows air drawn through the inlet, into the outlet;
   an air filter that captures dust contained in the air drawn through the inlet;
   a refrigerant circuit that performs an air conditioning operation on the air drawn through the inlet prior to being blown into a room through the outlet;
   a dust removing portion that performs a filter cleaning operation that removes, from the air filter, the dust captured by the air filter;
   a dust collecting container that collects the dust removed from the air filter;
   a dust storing container that stores dust transferred from the dust collecting container;
   a cleaning signal output portion that outputs cleaning signals indicating a need to remove the dust from the dust storing container, the cleaning signals including a warning signal, a first abnormal signal, and a second abnormal signal;
   an output control portion configured to control the cleaning signal output portion to output the warning signal when it is determined that an amount of dust in the dust collecting container has reached a predetermined first level, output the first abnormal signal when it is determined that the amount of dust in the dust collecting container has reached a second level that is higher than the first level, and output the second abnormal signal when it is determined that the amount of dust in the dust collecting container has reached a third level that is higher than the second level;
     inhibit the filter cleaning operation of the dust removing portion, when it is determined that the amount of dust in the dust collecting container has reached the second level; and
     perform a dust transfer operation that transfers dust collected in the dust collecting container to the dust storing container; and
   a reset input portion that inputs a command to terminate a state where the output control portion inhibits the cleaning operation,
   wherein the state where the output control portion inhibits the cleaning operation can be terminated by input to the reset input portion, only before it is determined that the amount of dust in the dust collecting container has reached the third level.

2. The indoor unit of claim 1, further comprising:
   a clogging detection section that detects clogging of the air filter, wherein
   the output control portion is further configured to inhibit air conditioning operation when it is determined based on an output of the clogging detection section that the clogging of the air filter has reached a predetermined level, after it is determined that the amount of dust in the dust storing portion has reached the second level.

3. The indoor unit of claim 1, wherein the output control portion is further configured to inhibit the air conditioning operation when it is determined that the amount of dust in the dust storing container has reached the second level.

4. The indoor unit of claim 1, further comprising:
   a detection sensor for detecting the amount of dust in the dust storing container, and
   wherein the output control portion is further configured to determine if the amount of dust in the dust storing container has reached the first level or not, based on an output of the detection sensor.

5. The indoor unit of claim 4, further comprising:
   a measuring timer for measuring an accumulated operation time of the indoor fan or the air conditioner after the amount of dust in dust storing portion has reached the first level, wherein the output control portion is further configured to determine if the amount of dust in the dust storing container has reached the second level or not, based on an accumulated operation time of the indoor fan or the air conditioner after it is determined that the amount of dust in the dust storing container has reached the first level.

6. The indoor unit of claim 5, further comprising:
   a measuring timer for measuring an accumulated operation time of the indoor fan or the air conditioner after the amount of dust in dust storing portion has reached the second level, wherein the output control portion is further configured to: determine if the amount of dust in the dust storing container has reached the third level or not, based on the accumulated operation time of the indoor fan or the air conditioner after it is determined that the amount of dust in the dust storing container has reached the second level.

7. The indoor unit of claim 1, further comprising:
   a measuring timer for measuring an accumulated operation time of the indoor fan or the air conditioner after the dust is removed from the dust storing container, and
   wherein the output control portion is further configured to control the cleaning signal output portion to output the caution signal, when the time measured by the measuring timer or a time calculated by using the measured time reaches a predetermined reference value.

8. The indoor unit of claim 4, further comprising:
   a sensor box attached to the dust storing container, the sensor box housing the detection sensor.

9. The indoor unit of claim 8, wherein the detection sensor includes a pair of components positioned at a height slightly lower than the center of the dust storing container such that light emitted from one of the components is detected by the second component after it sequentially passes through a first window and a second window of the dust storing container.

* * * * *